(12) United States Patent
Tezuka et al.

(10) Patent No.: US 11,300,355 B2
(45) Date of Patent: Apr. 12, 2022

(54) BOIL-OFF GAS SUPPLY DEVICE

(71) Applicant: KABUSHIKI KAISHA KOBE SEIKO SHO (Kobe Steel, Ltd.), Hyogo (JP)

(72) Inventors: Satoshi Tezuka, Takasago (JP); Katsuhiro Seyama, Takasago (JP); Kenji Nagura, Takasago (JP)

(73) Assignee: Kabushiki Kaisha Kobe Seiko Sho (Kobe Steel, Ltd.), Hyogo (JP)

( * ) Notice: Subject to any disclaimer, the term of this patent is extended or adjusted under 35 U.S.C. 154(b) by 390 days.

(21) Appl. No.: 16/066,613

(22) PCT Filed: Dec. 28, 2016

(86) PCT No.: PCT/JP2016/089120
§ 371 (c)(1),
(2) Date: Jun. 27, 2018

(87) PCT Pub. No.: WO2017/119397
PCT Pub. Date: Jul. 13, 2017

(65) Prior Publication Data
US 2019/0011179 A1 Jan. 10, 2019

(30) Foreign Application Priority Data

Jan. 7, 2016 (JP) .............................. JP2016-002067

(51) Int. Cl.
*F25J 1/02* (2006.01)
*F25J 1/00* (2006.01)
(Continued)

(52) U.S. Cl.
CPC ............... *F25J 1/0025* (2013.01); *F17C 9/00* (2013.01); *F17C 9/02* (2013.01); *F17C 9/04* (2013.01);
(Continued)

(58) Field of Classification Search
CPC ..... F17C 2250/03; F17C 9/02; F17C 2265/07
See application file for complete search history.

(56) References Cited

U.S. PATENT DOCUMENTS 3,885,394 A 5/1975 Witt et al.
8,353,314 B2 * 1/2013 Radford .................. F17C 13/04
137/614.05
(Continued)

FOREIGN PATENT DOCUMENTS

EP 2623414 A1 8/2013
EP 3372484 A1 * 9/2018 ......... F02M 21/0245
(Continued)

OTHER PUBLICATIONS

International Preliminary Report on Patentability issued in corresponding International Application No. PCT/JP2016/089120; dated Jul. 19, 2018.
(Continued)

*Primary Examiner* — Brian M King
(74) *Attorney, Agent, or Firm* — Studebaker & Brackett PC

(57) ABSTRACT

A boil-off gas supply device is provided with: a storage tank configured to store a liquefied gas; a first compression mechanism configured to suck in the boil-off gas of the liquefied gas stored in the storage tank and compress the sucked boil-off gas; a second compression mechanism configured to compress the boil-off gas after being compressed by the first compression mechanism; a discharge path in which the boil-off gas discharged from the second compression mechanism flows; a first drive source configured to drive the first compression mechanism; and a second drive source that is different from the first drive source and configured to drive the second compression mechanism.

16 Claims, 7 Drawing Sheets

(51) Int. Cl.
*F17C 13/00* (2006.01)
*F17C 9/00* (2006.01)
*F17C 9/04* (2006.01)
*F17C 9/02* (2006.01)
*F17C 13/04* (2006.01)

(52) U.S. Cl.
CPC .............. *F17C 13/00* (2013.01); *F17C 13/04* (2013.01); *F25J 1/006* (2013.01); *F25J 1/0201* (2013.01); *F25J 1/023* (2013.01); *F25J 1/0244* (2013.01); *F25J 1/0254* (2013.01); *F25J 1/0277* (2013.01); *F17C 2221/012* (2013.01); *F17C 2221/033* (2013.01); *F17C 2223/0161* (2013.01); *F17C 2223/033* (2013.01); *F17C 2223/043* (2013.01); *F17C 2227/0157* (2013.01); *F17C 2227/0185* (2013.01); *F17C 2227/0339* (2013.01); *F17C 2250/03* (2013.01); *F17C 2250/043* (2013.01); *F17C 2250/07* (2013.01); *F17C 2260/035* (2013.01); *F17C 2265/034* (2013.01); *F17C 2265/037* (2013.01); *F17C 2265/038* (2013.01); *F17C 2265/066* (2013.01); *F17C 2265/07* (2013.01); *F25J 2210/90* (2013.01); *F25J 2230/22* (2013.01); *F25J 2230/30* (2013.01)

(56) References Cited

U.S. PATENT DOCUMENTS

| | | | |
|---|---|---|---|
| 9,810,374 B2 * | 11/2017 | Nagura | ............... F17C 5/06 |
| 2011/0103976 A1 | 5/2011 | Fejzuli | |
| 2012/0240874 A1 | 9/2012 | Yoo et al. | |
| 2013/0340474 A1 | 12/2013 | Jung et al. | |
| 2014/0053600 A1 | 2/2014 | Jung et al. | |
| 2014/0060110 A1 | 3/2014 | Jung et al. | |
| 2014/0069117 A1 | 3/2014 | Jung et al. | |
| 2014/0069118 A1 | 3/2014 | Jung et al. | |
| 2014/0075943 A1 | 3/2014 | Jung et al. | |
| 2014/0369858 A1 | 12/2014 | Fejzuli | |
| 2015/0153005 A1 | 6/2015 | Takano et al. | |
| 2016/0348840 A1 | 12/2016 | Nagura et al. | |
| 2018/0274726 A1 | 9/2018 | Nagura et al. | |
| 2018/0320637 A1 | 11/2018 | Lee et al. | |
| 2019/0203667 A1 | 7/2019 | Lee et al. | |

FOREIGN PATENT DOCUMENTS

| | | | | |
|---|---|---|---|---|
| EP | 3372484 A1 | 9/2018 | | |
| JP | S51-069212 A | 6/1976 | | |
| JP | S62-062100 U | 4/1987 | | |
| JP | SHO 60-153962 | * | 4/1987 | ............... F17C 9/02 |
| JP | 2004-116544 A | 4/2004 | | |
| JP | 2007-010058 A | 1/2007 | | |
| JP | 201276559 A | 4/2012 | | |
| JP | 2015158213 A | 9/2015 | | |

OTHER PUBLICATIONS

The extended European search report issued by the European Patent Office dated Aug. 6, 2019, which corresponds to European Patent Application No. 16883896.9 and is related to U.S. Appl. No. 16/066,613.

* cited by examiner

BOIL-OFF GAS SUPPLY DEVICE

TECHNICAL FIELD

The present invention relates to a boil-off gas supply device.

BACKGROUND ART

Conventionally, as disclosed in Patent Literature 1 below, there is known a boil-off gas supply device that compresses a boil-off gas generated from a liquefied gas stored in a storage tank and supplies the compressed boil-off gas to a demander of gas. This boil-off gas supply device is provided with a storage tank that stores a liquefied natural gas (liquefied gas) and a compression device that sucks in and compresses the boil-off gas in the storage tank. The compression device is provided with a compression mechanism of multiple stages that are driven by a common drive source.

The boil-off gas supply device disclosed in Patent Literature 1 has a configuration in which multiple stages of the compression mechanism are driven by a common drive source, thereby raising a problem in that an optimal operation meeting the amount of generation of the boil-off gas and the amount of demand of the boil-off gas cannot be performed. In other words, in a case where the amount of driving the compression mechanism, for example, is reduced when the amount of demand of the boil-off gas is small, the amount of suction into the compression mechanism of the boil-off gas generated at all times is reduced. This raises a problem in that the gas pressure in the storage tank rises.

CITATION LIST

Patent Literature

Patent Literature 1: Japanese Unexamined Patent Publication No. 2015-132382

SUMMARY OF INVENTION

An object of the present invention is to meet the fluctuation in the amount of generation and the demand of the boil-off gas.

A boil-off gas supply device according to one aspect of the present invention includes a storage tank configured to store a liquefied gas; a first compression mechanism configured to suck in a boil-off gas of the liquefied gas stored in the storage tank and compress the sucked boil-off gas; a second compression mechanism configured to compress the boil-off gas after being compressed by the first compression mechanism; a discharge path in which the boil-off gas discharged from the second compression mechanism flows; a first drive source configured to drive the first compression mechanism; and a second drive source that is different from the first drive source and configured to drive the second compression mechanism.

DESCRIPTION OF EMBODIMENTS

Hereafter, embodiments for carrying out the present invention will be described in detail with reference to the drawings.

Figure 1:
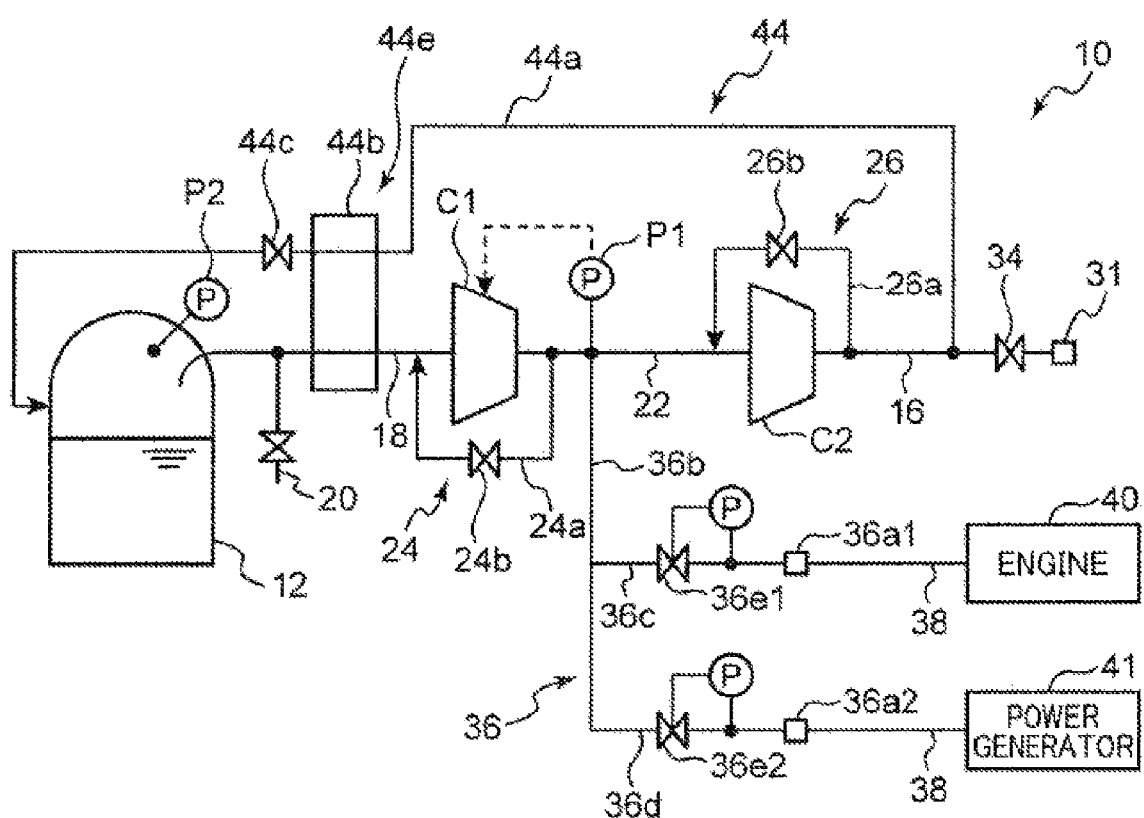
FIG. 1 is a diagram schematically illustrating a configuration of a boil-off gas supply device according to an embodiment of the present invention.

Referring to FIG. 1, a boil-off gas supply device 10 according to the present embodiment includes a storage tank 12, a first compression mechanism C1, a second compression mechanism C2, and a discharge path 16. The storage tank 12 stores a liquefied gas such as liquefied natural gas, liquefied hydrogen, or liquefied nitrogen.

Here, since the liquefied gas is a gas having a gaseous form at an ordinary temperature, a boil-off gas is generated from the liquefied gas when the gas is stored as the liquefied gas. For this reason, within the storage tank 12, a space above the liquefied gas is filled with the boil-off gas.

A suction path 18 is connected to the storage tank 12. One end of the suction path 18 is connected to a site above the liquid level of the liquefied gas in the storage tank 12, and the other end of the suction path 18 is connected to a suction inlet of the first compression mechanism C1. A discharge mechanism 20 is provided in the suction path 18. This discharge mechanism 20 is configured to discharge the boil-off gas within the suction path 18 to outside when the pressure within the suction path 18 becomes higher than a pressure set in advance. The discharge mechanism 20 is disposed at a position in the suction path 18 more upstream than a heat exchanger 44b described later; however, the discharge mechanism 20 may be disposed at a position more downstream than the heat exchanger 44b.

The first compression mechanism C1 sucks in the boil-off gas of the liquefied gas stored in the storage tank 12 and compresses the boil-off gas sucked. A connection path 22 is connected to a discharge outlet of the first compression mechanism C1. One end of the connection path 22 is connected to the discharge outlet of the first compression mechanism C1, and the other end of the connection path 22 is connected to a suction inlet of the second compression mechanism C2.

The boil-off gas supply device 10 is provided with a first spillback mechanism 24 and a second spillback mechanism 26.

The first spillback mechanism 24 is configured to return a part of the boil-off gas discharged from the first compression mechanism C1 to a suction side of the first compression mechanism C1, and has a bypass path 24a and an on-off valve 24b provided in the bypass path 24a. One end of the bypass path 24a is connected to the connection path 22. More specifically, one end (first end) of the bypass path 24a is connected to a site in the connection path 22 more upstream than a connection site of a branch path 36 described later. The other end of the bypass path 24a is connected to a site in the suction path 18 more downstream than the heat exchanger 44b described later. Here, the position of connecting the one end (first end) of the bypass path 24a is not limited to this position alone as long as the connecting position is a position at which the gas discharged from the first compression mechanism C1 flows in.

The second spillback mechanism 26 is configured to return a part of the boil-off gas discharged from the second compression mechanism C2 to a suction side of the second compression mechanism C2, and has a bypass path 26a and an on-off valve 26b provided in the bypass path 26a. One end (first end) of the bypass path 26a is connected to the discharge path 16, and the other end is connected to the connection path 22. More specifically, the other end of the bypass path 26a is connected to a site in the connection path 22 more downstream than a connection site of the branch path 36 described later. Here, the position of connecting the one end (first end) of the bypass path 26a is not limited to this position alone as long as the connecting position is a position at which the gas discharged from the second compression mechanism C2 flows in.

The second compression mechanism C2 further compresses the boil-off gas discharged from the first compression mechanism C1. The discharge path 16 is connected to a discharge outlet of the second compression mechanism C2. A first supply outlet 31 configured to discharge the boil-off gas is provided at a downstream end of the discharge path 16. A high-pressure gas pressurized by the second compression mechanism C2 can be supplied to a demander (high-pressure side demander) by connecting this first supply outlet 31 to a pipe 32 (see FIG. 5) that is connected to the demander of the gas.

An on-off valve 34, which is an on-off mechanism, is provided in the discharge path 16. The on-off valve 34 is disposed at a position in the discharge path 16 more downstream than the connection site of the bypass path 26a. The on-off valve 34 is opened when the pipe 32 connected to the demander is connected to the discharge path 16. On the other hand, referring to FIG. 1, the on-off valve 34 is closed when the pipe 32 is not connected and the first supply outlet 31 is not used. Here, the on-off valve 34 may be a back pressure valve in the same manner as on-off valves 36e1, 36e2 described later or may be a valve of another type.

A branch path 36 is connected to the connection path 22. One end of the branch path 36 is connected to the connection path 22, and the other ends of the branch path 36 are provided with second supply outlets 36a1, 36a2 configured to discharge the boil-off gas. The gas pressurized by the first compression mechanism C1 can be supplied (without being pressurized by the second compression mechanism C2) to a demander (low-pressure side demander) by connecting the second supply outlets 36a1, 36a2 to a pipe 38 that is connected to the demander of the gas.

In the present embodiment, the branch path 36 has a main pipe 36b whose one end is connected to the connection path 22, a first branch pipe 36c connected to the main pipe 36b, and a second branch pipe 36d connected to the main pipe 36b. In other words, the other end of the branch path 36 is branched to two (plural) pipes. The second supply outlets 36a1, 36a2 are provided in each of the first branch pipe 36c and the second branch pipe 36d. In FIG. 1, for example, the pipe 38 connected to an engine 40 functioning as a first demander is connected to the second supply outlet 36a1 of the first branch pipe 36c, and the pipe 38 connected to a power generator 41 functioning as a second demander is connected to the second supply outlet 36a2 of the second branch pipe 36d. Here, the branch path 36 may be one pipe that is not branched in the midway. In this case, only one second supply outlet is formed.

On-off valves 36e1, 36e2, each of which is an on-off mechanism, are provided in the branch path 36. The on-off valves 36e1, 36e2 are closed when the pipe 38 is not connected to the branch path 36 and the second supply outlets 36a1, 36a2 are not used. In the present embodiment, the on-off valve 36e1 is provided in the first branch pipe 36c and the on-off valve 36e2 is provided in the second branch pipe 36d. The on-off valve 36e1 of the first branch pipe 36c adjusts an opening degree so that the pressure of the gas supplied to the engine 40 attains a pressure set in advance. By this, a gas having a predetermined pressure is supplied from the first branch pipe 36c to the engine 40. The on-off valve 36e2 of the second branch pipe 36d adjusts an opening degree so that the pressure of the gas supplied to the power generator 41 attains a pressure set in advance. By this, a gas having a predetermined pressure is supplied from the second branch pipe 36d to the power generator. These on-off valves 36e1, 36e2 are all back-pressure valves, where different pressures may be set, or the same pressure may be set. Here, the on-off valves 36e1, 36e2 are not limited to a back-pressure valve, so that the on-off valves 36e1, 36e2 may be a valve whose opening degree can be adjusted or may be a simple on-off valve.

The boil-off gas supply device 10 of the present embodiment includes a return part 44 configured to re-liquefy the boil-off gas discharged from the second compression mechanism C2 and return the re-liquefied boil-off gas to the storage tank 12. The return part 44 has a return path 44a, a heat exchanger 44b configured to cool the boil-off gas flowing through the return path 44a, and an expansion mechanism 44c configured to expand and liquefy the boil-off gas cooled. In other words, a cooling part 44e configured to cool the boil-off gas in the return part 44 has the heat exchanger 44b configured to cool the boil-off gas in the return path 44a. The cooling part 44e and the expansion mechanism 44c constitute a re-liquefaction unit of the boil-off gas.

One end of the return path 44a is connected to a site in the discharge path 16 more upstream than the on-off valve 34, and the other end of the return path 44a is connected to the storage tank 12.

The heat exchanger 44b is configured to perform heat exchange between the boil-off gas flowing in the return path 44a and the boil-off gas flowing in the suction path 18. The boil-off gas flowing in the return path 44a is cooled by the boil-off gas flowing in the suction path 18.

The expansion mechanism 44c is disposed at a position in the return path 44a more downstream than the heat exchanger 44b. Accordingly, the expansion mechanism 44c expands and liquefies the fluid cooled in the heat exchanger 44b. This lowers the temperature of the fluid. The fluid (liquefied gas) having a lowered temperature is returned to the storage tank 12.

Figure 2A:
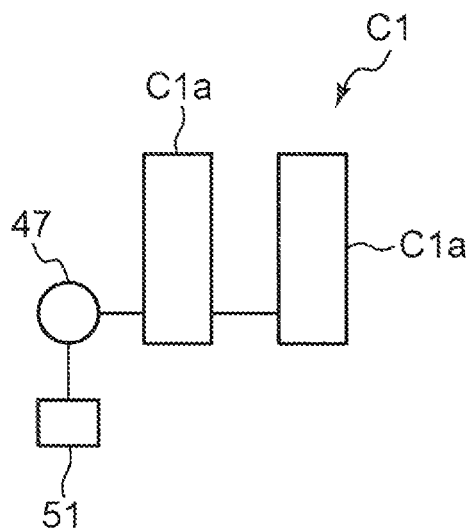
FIG. 2A is a diagram for describing a first compression mechanism and a first drive source provided in the boil-off gas supply device.

Referring to FIG. 2A, the first compression mechanism C1 is provided with multiple stages of compressors C1a. Also, referring to FIG. 2B, the second compression mechanism C2 is provided with multiple stages of compressors C2a. Here, although two stages of compressors C1a, C2a are exemplified in FIGS. 2A and 2B, at least one of the first compression mechanism C1 and the second compression mechanism C2 may have three or more stages of compressors C1a, C2a.

Each of the compressors C1a of the first compression mechanism C1 may be any of a screw compressor, a reciprocating compressor, and a turbo compressor.

When the compressor C1a constituting the first compression mechanism C1 is a screw compressor, control that accords to a load of the low-pressure side demander can be made by a slide valve mechanism not illustrated in the drawings. Accordingly, it is possible to avoid excessive compression of the gas, so that reduction in the amount of power of the first compression mechanism C1 can be achieved. In addition, when the rotation number is stable, fluctuation in the pressure and the flow rate is small. Therefore, little influence is given to the downstream side by pulsation. Also, the device can widely meet the change in suction conditions (temperature of sucking the gas). Also, there is an advantage in that the number of maintenance sites is small.

When the compressor C1a constituting the first compression mechanism C1 is a reciprocating compressor, there is an advantage in that a gas having a low temperature can be sucked in. In addition, the reciprocating compressor has an advantage of having a higher compression efficiency and employing a smaller motive power as compared with a screw compressor and a turbo compressor. Also, the reciprocating compressor can widely meet the change in suction conditions (temperature of sucking the gas).

When the compressor C1a constituting the first compression mechanism C1 is a turbo compressor, there is an advantage in that a gas can be sucked in at a low temperature. Also, there is an advantage in that the number of maintenance sites is small. The turbo compressor also has an advantage of having a high compression efficiency.

Each of the compressors C2a of the second compression mechanism C2 may be any of a screw compressor, a reciprocating compressor, and a turbo compressor. When the compressor C2a constituting the second compression mechanism C2 is a screw compressor, control that accords to a load of the high-pressure side demander can be made by a slide valve mechanism not illustrated in the drawings. Accordingly, it is possible to avoid excessive compression of the gas, so that reduction in the amount of power of the second compression mechanism C2 can be achieved. In addition, when the rotation number is stable, fluctuation in the pressure and the flow rate is small. Therefore, little influence is given to the downstream side by pulsation. Also, there is an advantage in that the number of maintenance sites is small.

When the compressor C2a constituting the second compression mechanism C2 is a reciprocating compressor, there is an advantage in that a gas can be compressed to a higher pressure as compared with other types of compressors. Also, the reciprocating compressor has an advantage of having a higher compression efficiency and employing a smaller motive power as compared with a screw compressor and a turbo compressor.

When the compressor C2a constituting the second compression mechanism C2 is a turbo compressor, there is an advantage in that the number of maintenance sites is small. The turbo compressor also has an advantage of having a high compression efficiency.

Figure 2B:
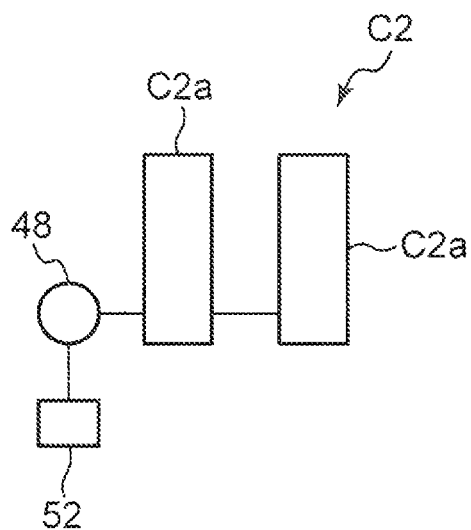
FIG. 2B is a diagram for describing a second compression mechanism and a second drive source provided in the boil-off gas supply device.

Referring to FIGS. 2A and 2B, the boil-off gas supply device 10 is provided with a first drive source 47 configured to drive the first compression mechanism C1 and a second drive source 48 configured to drive the second compression mechanism C2. The second drive source 48 is provided separately from the first drive source 47.

The first drive source 47 is configured to drive the multiple stages of compressors C1a collectively. For example, when the compressors C1a are reciprocating compressors, the first drive source 47 can be a motor that is connected to a crankshaft common to each of the compressors C1a. Here, the motor can be a motor of any type such as an electric motor or a hydraulic motor. Also, the first drive source 47 can be an internal combustion engine.

The second drive source 48 is configured to drive the multiple stages of compressors C2a collectively. For example, when the compressors C2a are reciprocating compressors, the second drive source 48 can be a motor that is connected to a crankshaft common to each of the compressors C2a. Here, the motor can be a motor of any type such as an electric motor or a hydraulic motor. Also, the second drive source 48 can be an internal combustion engine.

The boil-off gas supply device 10 is provided with a first pressure sensor P1 configured to detect a gas pressure within the connection path 22 and a second pressure sensor P2 configured to detect a pressure within the storage tank 12.

The first pressure sensor P1 outputs a signal indicative of the detected pressure. The signal output from the first pressure sensor P1 is input into a capacity control part 51 (see FIG. 2) configured to control driving of the first drive source 47. On the basis of the signal output from the first pressure sensor P1, the capacity control part 51 controls the first drive source (capacity adjustment part) 47 so that the amount of gas compression by the first compression mechanism C1 may change. Here, the capacity control part 51 is not limited to a configuration of controlling the first drive source 47. In short, it is sufficient that the capacity control part 51 is one that controls the capacity of the first compression mechanism C1, and the capacity control part 51 may have a configuration of controlling a capacity adjustment part such as a slide valve or an unloader.

The second pressure sensor P2 functions as a suction-side pressure sensing part configured to detect a pressure of the boil-off gas on the suction side of the first compression mechanism C1. The second pressure sensor P2 outputs a signal indicative of the detected pressure. The signal output from the second pressure sensor P2 is input into a return control part 52 (see FIG. 2) configured to control driving of the second drive source 48. On the basis of the signal output from the second pressure sensor P2, the return control part 52 controls the second drive source (capacity adjustment part) 48 so that the amount of gas compression by the second compression mechanism C2 may change. Here, the return control part 52 is not limited to a configuration of controlling the second drive source 48. In short, it is sufficient that the return control part 52 is one that controls the capacity of the second compression mechanism C2, and the return control part 52 may have a configuration of controlling a capacity adjustment part such as a slide valve or an unloader.

Next, an operation of the boil-off gas supply device 10 according to the present embodiment will be described with reference to FIGS. 3 and 4.

Figure 3:
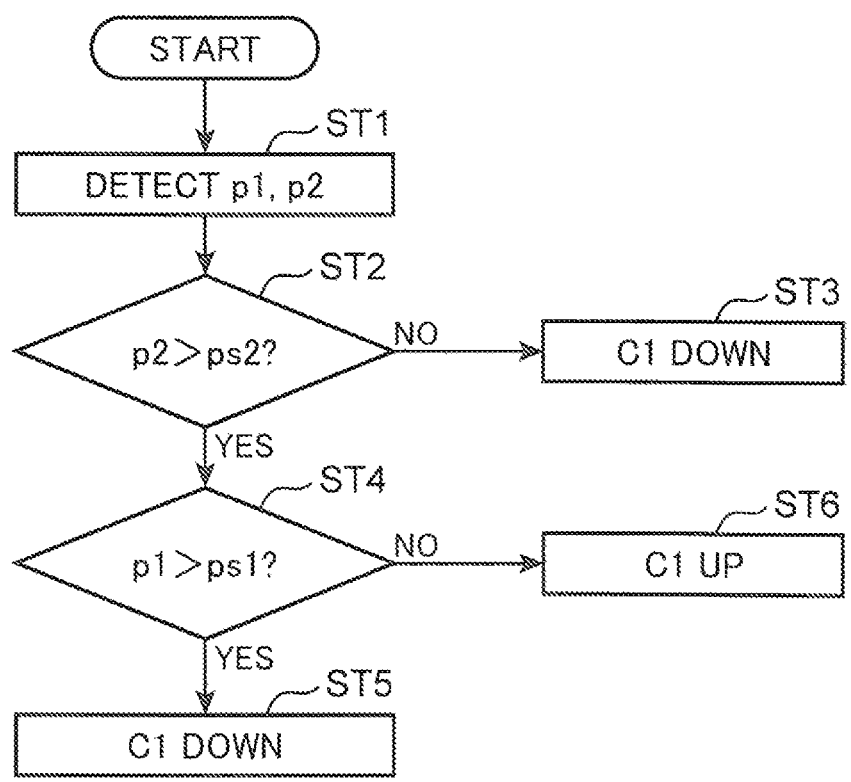
FIG. 3 is a flowchart for describing capacity control of the first compression mechanism in the boil-off gas supply device.
Figure 4:
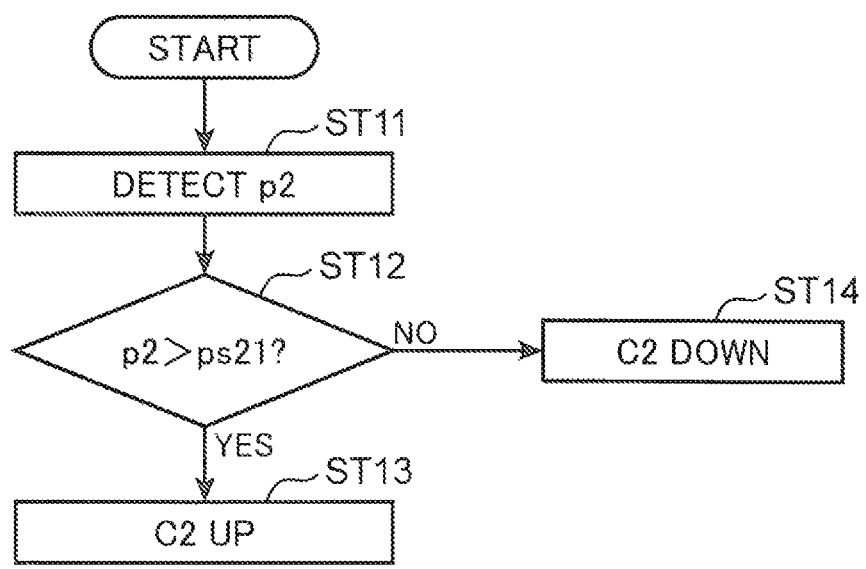
FIG. 4 is a flowchart for describing return control performed by the second compression mechanism in the boil-off gas supply device.

When the boil-off gas supply device 10 starts operating, operation of the first compression mechanism C1 is controlled (see FIG. 3), and operation of the second compression mechanism C2 is controlled (see FIG. 4).

Referring to FIG. 3, in the operation of the first compression mechanism C1, the pressure p1 on the discharge side of the first compression mechanism C1 is detected by the first pressure sensor P1, and the pressure p2 within the storage tank 12 is detected by the second pressure sensor P2 (step ST1). Further, whether the pressure p2 sensed by the second pressure sensor P2 is higher than a second threshold value ps2 set in advance or not is determined (step ST2). When the sensed pressure p2 is lower than or equal to the second threshold value ps2, the capacity control part 51 controls the first drive source 47 so that the amount of gas compressed by the first compression mechanism C1 decrease (step ST3). In other words, the second threshold value ps2 is set as a threshold value for determining a lower limit value of the boil-off gas amount in the storage tank 12. The case where the pressure p2 within the storage tank 12 is lower than or equal to the second threshold value ps2 corresponds to a case where the amount of generation of the boil-off gas in the storage tank 12 is extremely small. For this reason, the amount of driving the first compression mechanism C1 is decreased so as to reduce the amount of gas sucked by the first compression mechanism C1.

On the other hand, when the pressure p2 within the storage tank 12 is higher than the second threshold value ps2, whether the pressure p detected by the first pressure sensor P1, which is a pressure on the discharge side of the first compression mechanism C1, is higher than a target pressure ps1 set in advance or not is determined (step ST4). Further, when the pressure p detected by the first pressure sensor P1 is higher than the target pressure ps1, driving of the first drive source 47 is controlled so that the amount of gas compressed by the first compression mechanism C1 decrease (step ST5). On the other hand, when the detected pressure p1 is lower than or equal to the target pressure ps1, driving of the first drive source 47 is controlled so that the amount of gas compressed by the first compression mechanism C1 increase (step ST6). In other words, the pressure on the discharge side of the first compression mechanism C1 fluctuates depending on the demand of gas by the demander of the gas (for example, engine 40). When the demand of gas increases, the pressure on the discharge side of the first compression mechanism C1 goes down, whereas when the demand of gas decreases, the pressure on the discharge side of the first compression mechanism C1 goes up. Further, in the boil-off gas supply device 10 of the present embodiment, driving of the first drive source 47 is controlled on the basis of the pressure p1 detected by the first pressure sensor P1 so that the detected pressure p1 on the discharge side of the first compression mechanism C1 may approach the target pressure ps1. This stabilizes the pressure on the discharge side of the first compression mechanism C1.

In the operation of the second compression mechanism C2, first the pressure p2 within the storage tank 12 is detected by the second pressure sensor P2 (step ST11). Further, whether the pressure p2 detected by the second pressure sensor P2 is higher than a threshold value ps21 set in advance or not is determined (step ST12). When the sensed pressure p2 is higher than the threshold value ps21, the return control part 52 controls the second drive source 48 so that the amount of gas compressed by the second compression mechanism C2 increase (step ST13). On the other hand, when the detected pressure p2 is lower than or equal to the threshold value ps21, the return control part 52 controls the second drive source 48 so that the amount of gas compressed by the second compression mechanism C2 decrease (step ST14). In other words, the threshold value ps21 is set as a target pressure on the suction side of the first compression mechanism C1. Here, the threshold value ps21 is a value higher than the second threshold value ps2.

When the detected pressure p2, which is a pressure within the storage tank 12, is higher than the threshold value ps21 during the adjustment of the amount of gas compressed by the first compression mechanism C1, the amount of gas sucked from the storage tank 12 is not sufficient. Therefore, control is made in the boil-off gas supply device 10 to increase the amount of gas compressed by the second compression mechanism C2. This increases the amount of gas sucked by the second compression mechanism C2, whereby the pressure on the discharge side of the first compression mechanism C1 goes down. For this reason, the capacity control part 51 controls the first drive source 47 so that the amount of gas compression by the first compression mechanism C1 may increase. As a result, the suction amount of the boil-off gas from the storage tank 12 increases, and also the amount of the gas discharged from the second compression mechanism C2 and liquefied by the return part 44 can be increased. This can lower the pressure within the storage tank 12. On the other hand, when the detected pressure p2 is lower than or equal to the threshold value ps21, the amount of gas compression by the second compression mechanism C2 is reduced to raise the pressure within the storage tank 12.

As described above, in the present embodiment, the first compression mechanism C1 and the second compression mechanism C2 are driven by separate drive sources 47, 48, so that driving of the drive sources 47, 48 can be separately adjusted in accordance with the demand of the boil-off gas and the amount of generation of the boil-off gas from the liquefied gas. For this reason, when the demand of the gas is small as compared with the amount of generation of the boil-off gas, for example, the second compression mechanism C2 is stopped or the like, thereby enabling optimal operation that accords to the demand of the boil-off gas. Accordingly, the device can meet the fluctuation in the amount of generation and the demand of the boil-off gas.

Further, in the present embodiment, the first supply outlet 31 and the second supply outlets 36a1, 36a2 are provided, and opening and closing of the on-off valves 34, 36e1, 36e2 of the discharge path 16 and the branch path 36 can be switched. By this, the mode of use in which the boil-off gas is supplied from the first supply outlet 31 and the mode of use in which the boil-off gas is supplied from the second supply outlets 36a1, 36a2 can be separately employed in accordance with the gas pressure requested by the supply destination of the boil-off gas. Accordingly, the device can readily meet the situation in which there is a demand of the boil-off gas having a different pressure.

Further, in the present embodiment, the first compression mechanism C1 and the second compression mechanism C2 each have multiple stages of compressors C1a, C2a, so that the compression ratio in the first compression mechanism C1 and the second compression mechanism C2 can be increased. Moreover, the configuration of the boil-off gas supply device 10 can be simplified as compared with the case where a separate drive source is provided in each of the compressors C1a, C2a in each of the compression mechanisms C1, C2.

Further, in the present embodiment, the return part 44 is provided. For this reason, the boil-off gas in the storage tank 12 is sucked by the first compression mechanism C1; then the boil-off gas is liquefied after being discharged from the second compression mechanism C2; and this liquefied boil-off gas is returned to the storage tank 12. For this reason, even when the demand of the boil-off gas is small, the boil-off gas in the storage tank 12 can be sucked by continuous driving of the first compression mechanism C1 and the second compression mechanism C2, thereby making it possible to avoid a situation in which the pressure within the storage tank 12 becomes excessively high.

Further, the present embodiment is configured in such a manner that the boil-off gas is cooled in the return part 44, thereby making it possible to avoid a situation in which the temperature of the boil-off gas in the storage tank 12 gradually becomes high. In other words, rise in temperature within the storage tank 12 can be prevented by cooling the boil-off gas flowing towards the storage tank 12 with the cooling part.

Further, in the present embodiment, the cooling part has the heat exchanger 44*b*, and the liquefied gas obtained by expanding and liquefying the boil-off gas with the expansion mechanism 44*c* can be returned to the storage tank 12. For this reason, the pressure within the storage tank 12 can be prevented from becoming excessively high.

Further, the present embodiment is configured in such a manner that the boil-off gas discharged from the first compression mechanism C1 is supplied to the demander side, so that the gas pressure on the discharge side of the first compression mechanism C1 decreases when the demand of the boil-off gas becomes large. Therefore, the capacity control part 51 controls driving of the first drive source 47 so that the amount of the gas discharged from the first compression mechanism C1 may increase. On the other hand, the gas pressure on the discharge side of the first compression mechanism C1 increases when the demand of the boil-off gas becomes small. Therefore, the capacity control part 51 controls driving of the first drive source 47 so that the amount of the gas discharged from the first compression mechanism C1 may decrease. Accordingly, the capacity control of the first compression mechanism C1 can be appropriately made in accordance with the demand of the boil-off gas.

Further, in the present embodiment, in both of the case where the demand of the boil-off gas is large and the case where the demand of the boil-off gas is small, the amount of gas sucked from the storage tank 12 is not sufficient when the pressure of the boil-off gas on the suction side of the first compression mechanism C1 is high and the sensed value of the first pressure sensor P2 is higher than the threshold value ps21. In this case, the return control part 52 controls the second drive source 48 so that the amount of gas compressed by the second compression mechanism C2 increase. By this control of the second drive source 48, the pressure on the discharge side of the first compression mechanism C1 goes down, and accordingly the capacity control part 51 controls the first drive source 47 so that the amount of gas compressed by the first compression mechanism C1 increase. This increases the amount of the boil-off gas sucked from the storage tank 12. Accordingly, the amount of the boil-off gas compressed in the first compression mechanism C1 and the second compression mechanism C2 and re-liquefied in the return part 44 increases. This can lower the pressure within the storage tank 12.

On the other hand, when the gas pressure on the suction side of the first compression mechanism C1 goes down and the sensed value p2 of the second pressure sensor P2 becomes lower than the threshold value ps21, the return control part 52 controls the second drive source 48 so that the amount of gas compressed by the second compression mechanism C2 decrease. This can reduce the amount of the boil-off gas sucked in from the storage tank 12, thereby preventing the amount of the boil-off gas in the storage tank 12 from becoming excessively small.

Further, in the present embodiment, when the detected pressure p2 on the suction side of the first compression mechanism C1 is lower than the second threshold value ps2, the amount of gas compressed by the first compression mechanism C1 is reduced. For this reason, even when the amount of generation of the boil-off gas is small, excessive decrease in the gas pressure within the storage tank 12 can be prevented. In other words, when the amount of generation of the boil-off gas is small and the detected pressure p2 of the boil-off gas on the suction side of the first compression mechanism C1 is lower than the second threshold value ps2, the capacity control part 51 controls driving of the first compression mechanism C1 in accordance with the pressure on the suction side of the first compression mechanism C1 in preference to the control of driving in accordance with the pressure on the discharge side of the first compression mechanism C1. This can prevent the pressure within the storage tank 12 from becoming negative.

Further, in the present embodiment, the discharge mechanism 20 is provided, so that, when the demand of the boil-off gas is small, the pressure within the storage tank 12 can be prevented from becoming excessively high.

Here, the present invention is not limited to the embodiments described above, and various changes and modifications can be made within a range that does not depart from the gist thereof. For example, in the configuration of the aforementioned embodiments, driving of the first drive source 47 is controlled so that the pressure on the discharge side of the first compression mechanism C1 may attain the target pressure. Alternatively, however, the capacity control part 51 may be adapted to adjust the opening degree of the on-off valve 24*b* of the first spillback mechanism 24 so that the pressure on the discharge side of the first compression mechanism C1 may attain the target pressure.

In the configuration of the embodiments described above, driving of the second drive source 48 is controlled so that the pressure within the storage tank 12 may approach the threshold value ps21. Alternatively, however, the return control part 52 may be adapted to adjust the opening degree of the on-off valve 26*b* of the second spillback mechanism 26 so that the pressure within the storage tank 12 may approach the threshold value ps21.

Figure 5:
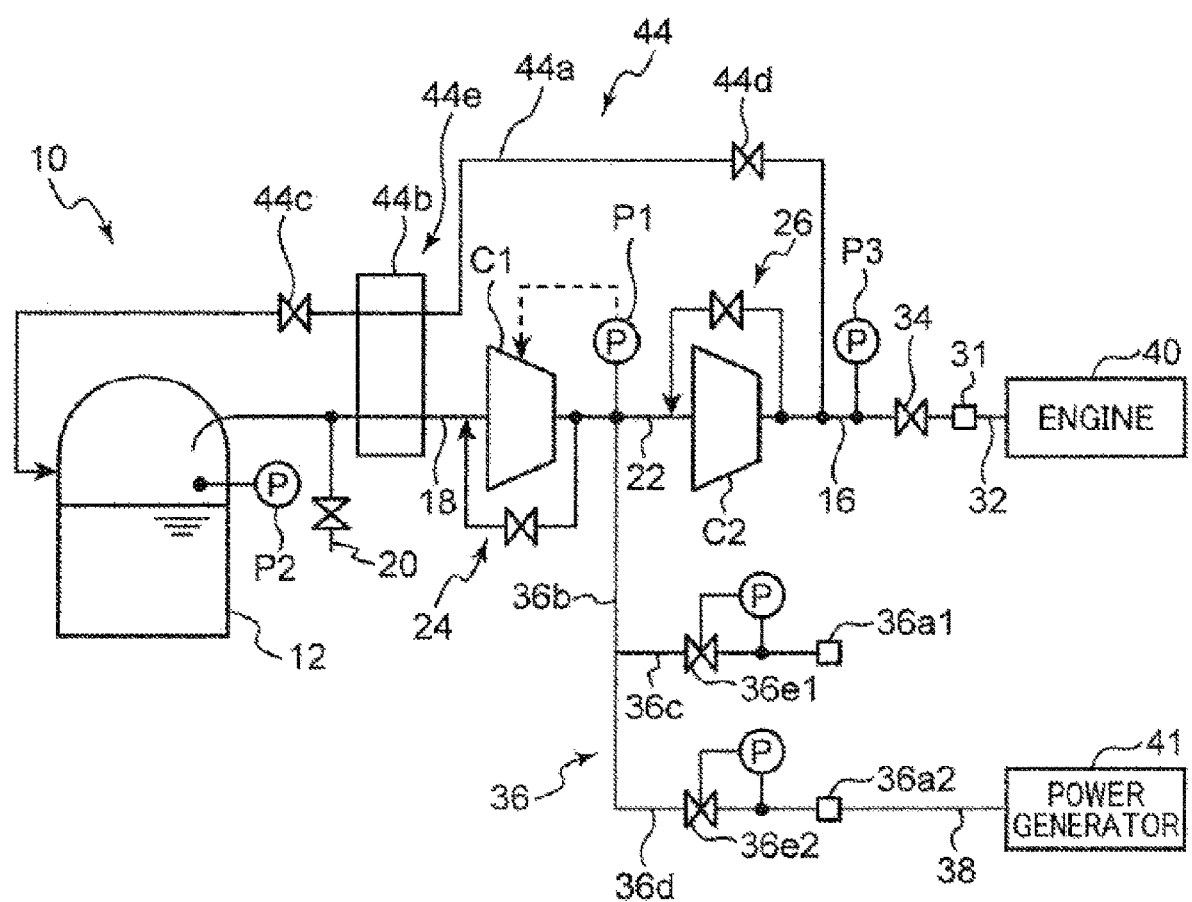
FIG. 5 is a diagram schematically illustrating a configuration of a boil-off gas supply device according to another embodiment of the present invention.

Referring to FIG. 1, in the embodiments described above, an operation has been described in the case where the demander of a low-pressure gas (engine 40) is connected to the second supply outlet 36*a*1. Referring to FIG. 5, in the boil-off gas supply device 10, there are cases in which the pipe 32 connected to the demander of the gas (engine 40) is connected to the first supply outlet 31. In other words, there are cases in which the demander of a high-pressure gas is connected to the boil-off gas supply device 10.

In this embodiment, a third pressure sensor P3, which is a second discharge-side pressure sensing part configured to detect the gas pressure on the discharge side of the second compression mechanism C2, is provided in addition to the first pressure sensor P1, which is a first discharge-side pressure sensing part configured to detect the pressure on the discharge side of the first compression mechanism C1, and the second pressure sensor P2, which is a suction-side pressure sensing part configured to detect the pressure on the suction side of the first compression mechanism C1 (pressure within the storage tank 12). The return path 44*a* is provided with the flow rate control valve 44*d* being a valve whose opening degree can be adjusted.

An operation in this case will be described with reference to FIGS. 6 and 7.

Figure 6:
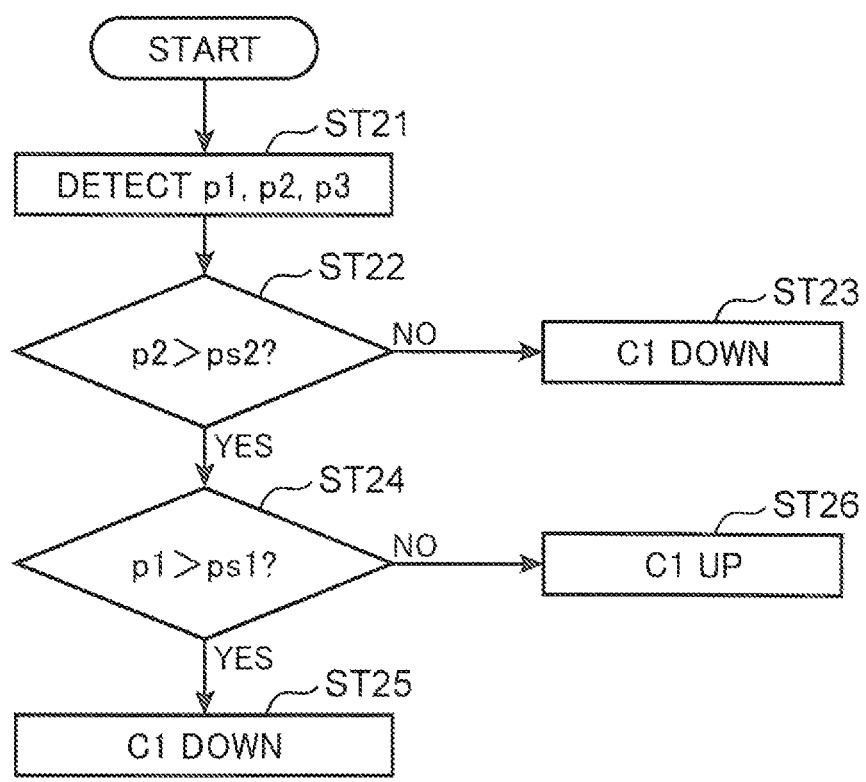
FIG. 6 is a flowchart for describing capacity control of the first compression mechanism in the boil-off gas supply device illustrated in FIG. 5.
Figure 7:
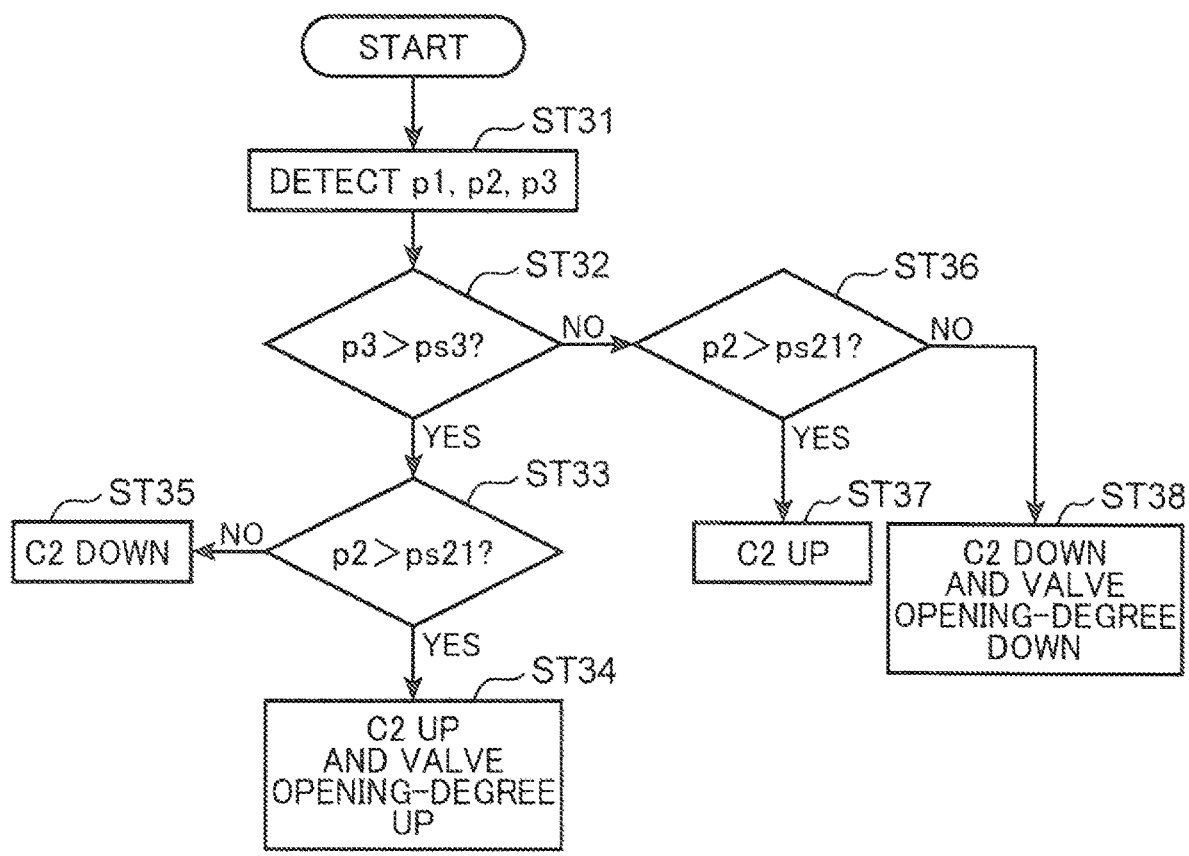
FIG. 7 is a flowchart for describing return control performed by the second compression mechanism in the boil-off gas supply device illustrated in FIG. 5.

FIG. 6 is a flowchart describing the control of driving of the first drive source 47. The control of driving of the first drive source 47 in the case where the engine 40 is connected to the first supply outlet 31 is substantially the same as that of the aforementioned embodiment in which the engine 40 is connected to the second supply outlet 36*a*1.

Hereafter, specific description will be given. First, the pressure p on the discharge side of the first compression mechanism C1 is detected by the first pressure sensor P1; the pressure p2 within the storage tank 12 is detected by the second pressure sensor P2; and the pressure p3 on the discharge side of the second compression mechanism C2 is detected by the third pressure sensor P3 (step ST21). Further, whether the pressure p2 detected by the second pressure sensor P2 is higher than a second threshold value ps2 or not is determined (step ST22). When the sensed pressure p2 is lower than or equal to the second threshold value ps2, the capacity control part 51 controls the first drive source 47 so that the amount of gas compressed by the first compression mechanism C1 decrease (step ST23). This corresponds to a case where the amount of generation of the boil-off gas in the storage tank 12 is extremely small. For this reason, the amount of gas sucked by the first compression mechanism C1 is controlled to reduce.

On the other hand, when the pressure p2 within the storage tank 12 is higher than the second threshold value ps2, whether the pressure p detected by the first pressure sensor P1, which is a pressure on the discharge side of the first compression mechanism C1, is higher than a first target pressure ps1 or not is determined (step ST24). Further, when the pressure p1 detected by the first pressure sensor P1 is higher than the first target pressure ps1, driving of the first drive source 47 is controlled so that the amount of gas compressed by the first compression mechanism C1 decrease (step ST25). On the other hand, when the sensed pressure p1 is lower than or equal to the first target pressure ps1, driving of the first drive source 47 is controlled so that the amount of gas compressed by the first compression mechanism C1 increase (step ST26). In other words, the pressure on the discharge side of the first compression mechanism C1 fluctuates depending on the amount of gas compressed by the second compression mechanism. Further, in the boil-off gas supply device of the present embodiment, driving of the first drive source 47 is controlled on the basis of the pressure p1 detected by the first pressure sensor P1 so that the detected pressure p on the discharge side of the first compression mechanism C1 may approach the first target pressure ps1.

Next, an operation of the second compression mechanism will be described with reference to FIG. 7. First, the pressure p1 on the discharge side of the first compression mechanism C1 is detected by the first pressure sensor P1; the pressure p2 within the storage tank 12 is detected by the second pressure sensor P2; and the pressure p3 on the discharge side of the second compression mechanism C2 is detected by the third pressure sensor P3 (step ST31). Further, whether the pressure p3 detected by the third pressure sensor P3 is higher than a second target pressure ps3 set in advance or not is determined (step ST32). When the demand of gas is small and the detected pressure p3 is higher than the second target pressure ps3, the process proceeds to the step ST33. In the step ST33, whether the pressure p2 detected by the second pressure sensor P2 is higher than a threshold value ps21 set in advance or not is determined. When the gas pressure within the storage tank 12 is high and the detected pressure p2 is higher than the threshold value ps21, the return control part 52 controls the second drive source 48 so that the amount of gas compressed by the second compression mechanism C2 may increase, and increases the valve opening degree of the flow rate control valve 44d (step ST34). By increase in the amount of gas compression by the second compression mechanism, the pressure on the suction side of the second compression mechanism C2 (discharge side of the first compression mechanism C1) goes down, so that the capcity control part 51 controls driving of the first drive source 47 so that the amount of gas compression by the first compression mechanism C1 may increase. This can increase the amount of gas sucked from the storage tank 12, and can lower the pressure within the storage tank 12. Moreover, at this time, the valve opening degree of the flow rate control valve 44d is increased, so that the flow rate of the gas introduced to the return path 44a, which is a part of the gas discharged from the second compression mechanism C2, can be increased. As a result, the pressure of the boil-off gas supplied from the second supply outlet 36a2 can be stabilized even when the demand of gas is small.

On the other hand, when the detected pressure p2 on the suction side is lower than the threshold value ps21 in the step ST33, the return control part 52 controls the second drive source 48 so that the amount of gas compression by the second compression mechanism C2 may decrease (step ST35). In other words, when the demand of gas is small and the detected pressure p3 on the discharge side of the second compression mechanism C2 is higher than the threshold value ps3, the amount of gas compression by the second compression mechanism C2 is reduced on condition that the detected pressure p2 on the suction side is lower than the threshold value ps21. This can raise the gas pressure within the storage tank 12 while suppressing the gas pressure on the discharge side of the second compression mechanism C2.

When the demand of gas is large and the detected pressure p3 is lower than the second target pressure ps3 in the step ST32, the process proceeds to the step ST36. In the step ST36, whether the pressure p2 detected by the second pressure sensor P2 is higher than the threshold value ps21 or not is determined. When the gas pressure within the storage tank 12 is high and the sensed pressure p2 is higher than the threshold value ps21, the return control part 52 controls the second drive source 48 so that the amount of gas compression by the second compression mechanism C2 may increase (step ST37). On the other hand, when the gas pressure within the storage tank 12 is low and the detected pressure p2 is lower than the threshold value ps21, the return control part 52 controls the second drive source 48 so that the amount of gas compression by the second compression mechanism C2 may decrease, and decreases the valve opening degree of the flow rate control valve 44d (step ST38). In other words, when the demand of gas is large, the amount of gas compressed by the second compression mechanism C2 is increased on condition that the pressure within the storage tank 12 is high. On the other hand, when the pressure within the storage tank 12 is low, lowering of the gas pressure on the discharge side of the second compression mechanism C2 is suppressed by decreasing the valve opening degree of the flow rate control valve 44d while reducing the amount of gas compressed by the second compression mechanism C2.

In the configuration of this embodiment, the boil-off gas discharged from the second compression mechanism C2 is supplied to the demander side, so that the gas pressure on the discharge side of the second compression mechanism C2 decreases when the demand of the boil-off gas is large, whereas the gas pressure on the discharge side of the second compression mechanism C2 increases when the demand of the boil-off gas is small. Further, when the demand of gas is small and the gas pressure on the discharge side of the second compression mechanism C2 is higher than the second target pressure ps3, control for reducing the amount of gas compressed by the second compression mechanism C2 is made on condition that the detected pressure p2 on the suction side of the first compression mechanism C1 is lower than the threshold value ps21. In other words, when the pressure on the discharge side of the second compression mechanism C2 is higher than the second target pressure ps3 due to small demand of the gas, the amount of gas compressed by the second compression mechanism C2 is reduced, so that the gas pressure on the discharge side of the first compression mechanism C1 tends to become high. On the other hand, since the first drive source 47 is controlled so that the pressure on the discharge side of the first compression mechanism C1 may attain the first target pressure, the amount of gas compressed by the first compression mechanism C1 is reduced. This reduces the amount of suction of the boil-off gas from the storage tank 12, so that the gas pressure within the storage tank 12 can be increased. Accordingly, a gas that meets the demand of the gas can be supplied while appropriately maintaining the gas pressure within the storage tank 12.

Also, when the demand of gas is small and the detected pressure p3 on the discharge side of the second compression mechanism C2 is higher than the second target pressure ps3, the return control part 52 performs control for increasing the amount of gas compressed by the second compression mechanism C2 on condition that the detected pressure p2 on the suction side of the first compression mechanism C1 is higher than the threshold value ps21. This increases the amount of gas compressed by the first compression mechanism C1, so that the amount of gas sucked from the storage tank 12 can be increased. As a result, the gas pressure on the suction side of the first compression mechanism C1 can be made to approach the threshold value ps21. Moreover, since the return control part 52 increases the opening degree of the flow rate control valve 44d at this time, increase in the pressure on the discharge side of the second compression mechanism C2 can be suppressed even when the amount of gas compressed by the second compression mechanism C2 increases. Accordingly, the device can meet a case where the demand of gas is small, and the gas pressure within the storage tank 12 can be reduced while maintaining the pressure of the gas supplied to the demander side.

Also, when the detected pressure p2 on the suction side of the first compression mechanism C1 is higher than the threshold value ps21 in the case where the demand of gas is large and the gas pressure on the discharge side of the second compression mechanism C2 is lower than the second target pressure ps3, the return control part 52 performs control for increasing the amount of gas compressed by the second compression mechanism C2. This increases the amount of gas compressed by the first compression mechanism C1, so that the amount of gas sucked from the storage tank 12 can be increased. By this, the gas pressure on the suction side of the first compression mechanism C1 can be made to approach the target pressure.

Also, when the demand of gas is large and the gas pressure on the discharge side of the second compression mechanism C2 is lower than the second target pressure ps3, the return control part 52 performs control for reducing the amount of gas compressed by the second compression mechanism C2 on condition that the detected pressure p2 on the suction side of the first compression mechanism C1 is lower than the threshold value ps21. This reduces the amount of gas compressed by the first compression mechanism C1, and as a result, the amount of gas sucked from the storage tank 12 can be reduced. As a result, the gas pressure on the suction side of the first compression mechanism C1 can be made to approach the threshold value ps21. Moreover, since the return control part 52 decreases the opening degree of the flow rate control valve 44d of the return part 44 at this time, decrease in the pressure on the discharge side of the second compression mechanism C2 can be suppressed even when the amount of gas compressed by the second compression mechanism C2 decreases. Accordingly, the device can meet a case where the demand of gas is large, and the gas pressure within the storage tank 12 can be increased while maintaining the pressure of the gas supplied to the demander side.

In the embodiments described above, the first compression mechanism C1 is configured with multiple stages of compressors; however, the embodiment is not limited to this alone. The first compression mechanism C1 may be configured with a single stage of a compressor.

In the embodiments described above, the second compression mechanism C2 is configured with multiple stages of compressors; however, the embodiment is not limited to this alone. The second compression mechanism C2 may be configured with a single stage of a compressor.

A third compression mechanism (not illustrated in the drawings) may be further provided at a stage posterior to the second compression mechanism C2, and a first supply outlet 31 may be provided on the discharge side of this third compression mechanism.

A compression mechanism (not illustrated in the drawings) may be further provided between the first compression mechanism C1 and the second compression mechanism C2.

In the configuration of the embodiments described above, the second pressure sensor P2 functioning as a suction-side pressure sensing part that detects the pressure of the boil-off gas on the suction side of the first compression mechanism C1 is disposed in the storage tank 12; however, the embodiment is not limited to this alone. For example, the second pressure sensor P2 may be disposed in the suction path 18.

In the embodiments described above, the capacity control part 51 is configured to control the capacity of the first compression mechanism C1; however, together with this or instead of this, the capacity control part 51 may be configured to control the first spillback mechanism 24.

In the embodiments described above, the return control part 52 is configured to control the capacity of the second compression mechanism C2; however, together with this or instead of this, the return control part 52 may be configured to control the second spillback mechanism 26.

Summary of Embodiments

Here, the aforementioned embodiments will be schematically described.

(1) In the aforementioned embodiments, the first compression mechanism and the second compression mechanism are driven by separate drive sources, so that driving of the drive sources can be separately adjusted in accordance with the demand of the boil-off gas and the amount of generation of the boil-off gas from the liquefied gas. For this reason, when the demand of the gas is small as compared with the amount of generation of the boil-off gas, for example, the second compression mechanism is stopped or the like, thereby enabling optimal operation that accords to the demand of the boil-off gas. Accordingly, the device can meet the fluctuation in the amount of generation and the demand of the boil-off gas.

(2) A first supply outlet of the boil-off gas may be provided in the discharge path. A second supply outlet of the boil-off gas may be provided in a branch path branched from a connection path that connects between the first compression mechanism and the second compression mechanism. In this case, an on-off mechanism may be provided in each of the discharge path and the branch path.

In this embodiment, opening and closing of the on-off mechanisms of the discharge path and the branch path can be switched, whereby the mode of use in which the boil-off gas is supplied from the first supply outlet and the mode of use in which the boil-off gas is supplied from the second supply outlet can be separately employed in accordance with the gas pressure requested by the supply destination of the boil-off gas. Accordingly, the device can readily meet the situation in which there is a demand of the boil-off gas having a different pressure.

(3) The first compression mechanism may have multiple stages of compressors. In this case, the first drive source may be configured to drive the multiple stages of compressors collectively.

In this embodiment, the first compression mechanism has multiple stages of compressors, so that the compression ratio in the first compression mechanism can be increased. Moreover, the configuration of the boil-off gas supply device can be simplified as compared with the case where a separate drive source is provided in each of the compressors in the first compression mechanism.

(4) The second compression mechanism may have multiple stages of compressors. The second drive source may be configured to drive the multiple stages of compressors collectively.

In this embodiment, the second compression mechanism has multiple stages of compressors, so that the compression ratio in the second compression mechanism can be increased. Moreover, the configuration of the boil-off gas supply device can be simplified as compared with the case where a separate drive source is provided in each of the compressors in the second compression mechanism.

(5) The boil-off gas supply device may further include a return part configured to re-liquefy the boil-off gas discharged from the second compression mechanism and return the re-liquefied boil-off gas to the storage tank.

In this embodiment, the boil-off gas in the storage tank is sucked by the first compression mechanism; then the boil-off gas is liquefied after being discharged from the second compression mechanism; and this liquefied boil-off gas is returned to the storage tank. Therefore, even when the demand of the boil-off gas is small, the boil-off gas in the storage tank can be sucked by continuous driving of the first compression mechanism or the second compression mechanism. For this reason, the pressure within the storage tank can be prevented from becoming excessively high.

(6) The return part may have a cooling part configured to cool the boil-off gas in a return path that flows towards the storage tank.

In this embodiment, the temperature of the boil-off gas in the storage tank can be prevented from becoming gradually high. In other words, rise in the temperature within the storage tank can be prevented by cooling the boil-off gas flowing towards the storage tank with the cooling part.

(7) The cooling part may have a heat exchanger configured to perform heat exchange between the boil-off gas in the return path and the boil-off gas in a state before being sucked into the first compression mechanism.

In this embodiment, the liquefied gas liquefied from the boil-off gas can be returned to the storage tank, so that the pressure within the storage tank can be prevented from becoming excessively high.

(8) The boil-off gas supply device may be configured in such a manner that boil-off gas discharged from the first compression mechanism is supplied to a demander side. In this case, the boil-off gas supply device may further include a pressure sensing part configured to detect a pressure of the boil-off gas on a discharge side of the first compression mechanism and a capacity control part configured to control a capacity of the first compression mechanism so that the pressure detected by the pressure sensing part comes to be a target pressure that is set in accordance with an amount of demand of the boil-off gas.

In this embodiment, the boil-off gas supply device is configured in such a manner that the boil-off gas discharged from the first compression mechanism is supplied to the demander side, so that the gas pressure on the discharge side of the first compression mechanism decreases when the demand of the boil-off gas becomes large. For this reason, the capacity control part controls the capacity of the first compression mechanism so that the amount of the gas discharged from the first compression mechanism may increase. On the other hand, the gas pressure on the discharge side of the first compression mechanism increases when the demand of the boil-off gas becomes small. For this reason, the capacity control part controls the capacity of the first compression mechanism so that the amount of the gas discharged from the first compression mechanism may decrease. Accordingly, driving of the first compression mechanism can be appropriately controlled in accordance with the demand of the boil-off gas.

(9) The boil-off gas supply device may have a configuration in which the boil-off gas discharged from the first compression mechanism is supplied to a demander side. In this case, the boil-off gas supply device may further include a spillback mechanism configured to return the boil-off gas from a discharge side to a suction side of the first compression mechanism, a pressure sensing part configured to detect a pressure of the boil-off gas on the discharge side of the first compression mechanism, and a capacity control part configured to control the spillback mechanism so that a detected value of the pressure sensing part comes to be a target pressure that is set in accordance with an amount of demand of the boil-off gas.

(10) The capacity control part may be configured to control the spillback mechanism and the capacity of the first compression mechanism so that a detected value of the pressure sensing part comes to be a target pressure that is set in accordance with an amount of demand of the boil-off gas.

(11) The boil-off gas supply device may further include a suction-side pressure sensing part configured to detect a pressure of the boil-off gas on a suction side of the first compression mechanism and a return control part configured to control a capacity of the second compression mechanism in accordance with a result of comparison between the gas pressure detected by the suction-side pressure sensing part and a threshold value set in advance.

In this embodiment, the return control part controls the capacity of the second compression mechanism in accordance with a result of comparison between the gas pressure detected by the suction-side pressure sensing part and the threshold value set in advance, so that the pressure within the storage tank can be appropriately adjusted. In other words, in both of the case where the demand of the boil-off gas is large and the case where the demand of the boil-off gas is small, the amount of gas sucked from the storage tank is not sufficient when the pressure of the boil-off gas on the suction side of the first compression mechanism is high and the detected value of the suction-side pressure sensing part is higher than the threshold value. In this case, the return control part controls the capacity of the second compression mechanism so that the amount of gas compressed by the second compression mechanism may increase. By this control of the capacity of the second compression mechanism, the pressure on the discharge side of the first compression mechanism goes down, and accordingly the capacity control part controls the capacity of the first compression mechanism so that the amount of gas compressed by the first compression mechanism may increase. This increases the amount of the boil-off gas sucked from the storage tank. Accordingly, the amount of the boil-off gas compressed in the first compression mechanism and the second compression mechanism and re-liquefied in the return part increases. This can lower the pressure within the storage tank.

On the other hand, when the gas pressure on the suction side of the first compression mechanism goes down and the detected value of the suction-side pressure sensing part becomes lower than the threshold value, the return control part controls the capacity of the second compression mechanism so that the amount of gas compressed by the second compression mechanism may decrease. This can reduce the amount of the boil-off gas sucked in from the storage tank, thereby preventing the amount of the boil-off gas in the storage tank from becoming excessively small.

(12) The capacity control part may be configured to control the capacity of the first compression mechanism so that the amount of gas compressed by the first compression mechanism may decrease when the gas pressure detected by the suction-side pressure sensing part is lower than a second threshold value that is set to have the same value as or to be lower than the threshold value.

In this embodiment, even when the amount of generation of the boil-off gas is small, excessive decrease in the gas pressure within the storage tank can be prevented. In other words, when the amount of generation of the boil-off gas is small and the pressure of the boil-off gas on the suction side of the first compression mechanism is lower than the second threshold value, the capacity control part controls driving of the first compression mechanism in accordance with the pressure on the suction side of the first compression mechanism in preference to the control of driving in accordance with the pressure on the discharge side of the first compression mechanism. This can prevent the pressure within the storage tank from becoming negative.

(13) The boil-off gas supply device may further include a suction-side pressure sensing part configured to detect a pressure of the boil-off gas on a suction side of the first compression mechanism, a first discharge-side pressure sensing part configured to detect a pressure of the boil-off gas on a discharge side of the first compression mechanism, a second discharge-side pressure sensing part configured to detect a pressure of the boil-off gas on a discharge side of the second compression mechanism, and a capacity control part configured to control a capacity of the first compression mechanism so that a detected value by the first discharge-side pressure sensing part comes to be a first target pressure set in advance. In this case, the boil-off gas supply device may be configured in such a manner that the boil-off gas discharged from the second compression mechanism is supplied to a demander side. The boil-off gas supply device may further include a return control part configured to control a capacity of the second compression mechanism so that an amount of gas compressed by the second compression mechanism may decrease when a gas pressure detected by the second discharge-side pressure sensing part is higher than a second target pressure, on condition that the pressure detected by the suction-side pressure sensing part is lower than a threshold value set in advance.

In this embodiment, the boil-off gas supply device is configured in such a manner that the boil-off gas discharged from the second compression mechanism is supplied to the demander side, so that the gas pressure on the discharge side of the second compression mechanism decreases when the demand of the boil-off gas is large, whereas the gas pressure on the discharge side of the second compression mechanism increases when the demand of the boil-off gas is small. Further, when the demand of gas is small and the gas pressure on the discharge side of the second compression mechanism is higher than the second target pressure, control for reducing the amount of gas compressed by the second compression mechanism is made on condition that the gas pressure on the suction side of the first compression mechanism is lower than the threshold value. In other words, when the pressure on the discharge side of the second compression mechanism is higher than the second target pressure due to small demand of the gas, the amount of gas compressed by the second compression mechanism is reduced. By this, the gas pressure on the suction side of the second compression mechanism rises. In other words, the gas pressure on the discharge side of the first compression mechanism rises. On the other hand, since the first compression mechanism is controlled so that the pressure on the discharge side of the first compression mechanism may attain the first target pressure, the amount of gas compressed by the first compression mechanism is reduced. This reduces the amount of suction of the boil-off gas from the storage tank, so that the gas pressure within the storage tank can be increased. Accordingly, a gas that meets the demand of the gas can be supplied while appropriately maintaining the gas pressure within the storage tank.

(14) The return part may have a flow rate control valve. In this case, when the pressure detected by the suction-side pressure sensing part is higher than the threshold value in the case where the gas pressure detected by the second discharge-side pressure sensing part is higher than the second target pressure, the return control part may be configured to increase an opening degree of the flow rate control valve and to control the capacity of the second compression mechanism so that the amount of gas compressed by the second compression mechanism may increase.

In this embodiment, when the demand of gas is small and the gas pressure on the discharge side of the second compression mechanism is higher than the second target pressure, the return control part performs control for increasing the amount of gas compressed by the second compression mechanism on condition that the gas pressure on the suction side of the first compression mechanism is higher than the threshold value. This increases the amount of gas compressed by the first compression mechanism, so that the amount of gas sucked from the storage tank can be increased. As a result, the gas pressure on the suction side of the first compression mechanism can be made to approach the threshold value. Moreover, since the return control part increases the opening degree of the flow rate control valve at this time, increase in the pressure on the discharge side of the second compression mechanism can be suppressed even when the amount of gas compressed by the second compression mechanism increases. Accordingly, the device can meet a case where the demand of gas is small, and the gas pressure within the storage tank can be reduced while maintaining the pressure of the gas supplied to the demander side.

(15) The return control part may control the capacity of the second compression mechanism so that the amount of gas compressed by the second compression mechanism may increase when the gas pressure detected by the second discharge-side gas pressure sensing part is lower than the second target pressure, on condition that the gas pressure detected by the suction-side gas pressure sensing part is higher than the threshold value.

In this embodiment, when the gas pressure on the suction side of the first compression mechanism is higher than the threshold value in the case where the demand of gas is large and the gas pressure on the discharge side of the second compression mechanism is lower than the second target pressure, the return control part performs control for increasing the amount of gas compressed by the second compression mechanism. This increases the amount of gas compressed by the first compression mechanism, so that the amount of gas sucked from the storage tank can be increased. By this, the gas pressure on the suction side of the first compression mechanism can be made to approach the target pressure.

(16) The return part may have a flow rate control valve. In this case, when the gas pressure detected by the suction-side gas pressure sensing part is lower than the threshold value in the case where the gas pressure detected by the second discharge-side gas pressure sensing part is lower than the second target pressure, the return control part may be configured to decrease an opening degree of the flow rate control valve and to control the capacity of the second compression mechanism so that the amount of gas compressed by the second compression mechanism may decrease.

In this embodiment, when the demand of gas is large and the gas pressure on the discharge side of the second compression mechanism is lower than the second target pressure, the return control part performs control for reducing the amount of gas compressed by the second compression mechanism on condition that the gas pressure on the suction side of the first compression mechanism is lower than the target pressure. This reduces the amount of gas compressed by the first compression mechanism, and as a result, the amount of gas sucked from the storage tank can be reduced. As a result, the gas pressure on the suction side of the first compression mechanism can be made to approach the target pressure. Moreover, since the return control part decreases the opening degree of the flow rate control valve of the return part at this time, decrease in the pressure on the discharge side of the second compression mechanism can be suppressed even when the amount of gas compressed by the second compression mechanism decreases. Accordingly, the device can meet a case where the demand of gas is large, and the gas pressure within the storage tank can be increased while maintaining the pressure of the gas supplied to the demander side.

(17) The boil-off gas supply device may further include a discharge mechanism configured to discharge the boil-off gas when the pressure within the storage tank is excessively high.

In this embodiment, when the demand of the boil-off gas is small, the pressure within the storage tank can be prevented from becoming excessively high.

As described above, the aforementioned embodiments can meet the fluctuation in the amount of generation and the demand of the boil-off gas.

The invention claimed is:

1. A boil-off gas supply device comprising:
a storage tank configured to store a liquefied gas;
a first compressor unit configured to draw-in a boil-off gas of the liquefied gas stored in the storage tank and compress the drawn-in boil-off gas;
a second compressor unit configured to compress the boil-off gas after being compressed by the first compressor unit;
a discharge path in which the boil-off gas discharged from the second compressor unit flows;
a first drive source configured to drive the first compressor unit;
a second drive source that is different from the first drive source and configured to drive the second compressor unit;
a return part including a return path connecting the discharge path and the storage tank and configured to re-liquefy the boil-off gas discharged from the second compressor unit and return the re-liquefied boil-off gas to the storage tank;
a first spillback mechanism configured to return a part of the boil-off gas discharged from the first compressor unit to a suction side of the first compressor unit;
a slide valve configured to control a capacity of the first compressor unit;
a capacity controller configured to control at least one of the first spillback mechanism and the slide valve;
a suction-side pressure sensor configured to detect a pressure of the boil-off gas on a suction side of the first compressor unit; and
a first discharge-side pressure sensor configured to detect a pressure of the boil-off gas at a position between the first compressor unit and the second compressor unit; wherein
a second supply outlet of the boil-off gas is provided in a branch path branched from a connection path that connects between the first compressor unit and the second compressor unit;
the boil-off gas discharged from the first compressor unit is supplied to a demander side, and
the capacity controller is configured to control at least one of the first spillback mechanism and the slide valve so as to decrease an amount of gas compressed by the first compressor unit when a pressure detected by the suction-side pressure sensor is lower than or equal to a second threshold value, and
the capacity controller is configured to control at least one of the first spillback mechanism and the slide valve so that a detected value of the first discharge-side pressure sensor comes to be a target pressure that is set in accordance with an amount of demand of the boil-off gas when the pressure detected by the suction-side pressure sensor is higher than the second threshold value.

2. The boil-off gas supply device according to claim 1, wherein
a first supply outlet of the boil-off gas is provided in the discharge path; and
an on-off valve is provided in each of the discharge path and the branch path.

3. The boil-off gas supply device according to claim 1, wherein
the first compressor unit has multiple stages of compressors, and
the first drive source is configured to drive the multiple stages of compressors collectively.

4. The boil-off gas supply device according to claim 3, wherein
the second compressor unit has multiple stages of compressors, and
the second drive source is configured to drive the multiple stages of compressors collectively.

5. The boil-off gas supply device according to claim 1, wherein the return part has a cooling part configured to cool the boil-off gas in the return path that flows towards the storage tank.

6. The boil-off gas supply device according to claim 5, wherein the cooling part has a heat exchanger configured to perform heat exchange between the boil-off gas in the return path and the boil-off gas in a state before being drawn-in by the first compressor unit.

7. The boil-off gas supply device according to claim 1, further comprising:
a return controller configured to control a capacity of the second compressor unit in accordance with a result of comparison between the gas pressure detected by the suction-side pressure sensor and a threshold value set in advance.

8. The boil-off gas supply device according to claim 7, wherein the capacity controller is configured to control the capacity of the first compressor unit so that an amount of gas compressed by the first compressor unit decreases when the gas pressure detected by the suction-side pressure sensor is lower than the second threshold value that is set to have the same value as or to be lower than the threshold value set in advance.

9. The boil-off gas supply device according to claim 1, further comprising:
a suction-side pressure sensor configured to detect a pressure of the boil-off gas on a suction side of the first compressor unit;
a first discharge-side pressure sensor configured to detect a pressure of the boil-off gas on a discharge side of the first compressor unit;
a second discharge-side pressure sensor configured to detect a pressure of the boil-off gas on a discharge side of the second compressor unit; and
a capacity controller configured to control a capacity of the first compressor unit so that a value detected by the first discharge-side pressure sensor comes to be a first target pressure set in advance,
wherein
the boil-off gas discharged from the second compressor unit is supplied to a demander side, and
the boil-off gas supply device further comprises a return controller configured to control a capacity of the second compressor unit so that an amount of gas compressed by the second compressor unit decreases when a gas pressure detected by the second discharge-side pressure sensing sensor is higher than a second target pressure, on condition that the pressure detected by the suction-side pressure sensor is lower than a threshold value set in advance.

10. The boil-off gas supply device according to claim 9, wherein
the return part has a flow rate control valve, and
when the pressure detected by the suction-side pressure sensor is higher than the threshold value in the case where the gas pressure detected by the second discharge-side pressure sensor is higher than the second target pressure, the return controller is configured to increase an opening degree of the flow rate control valve and to control the capacity of the second compressor unit so that the amount of gas compressed by the second compressor unit increases.

11. The boil-off gas supply device according to claim 9, wherein the return controller controls the capacity of the second compressor unit so that the amount of gas compressed by the second compressor unit increases when the gas pressure detected by the second discharge-side gas pressure sensor is lower than the second target pressure, on condition that the gas pressure detected by the suction-side gas pressure sensor is higher than the threshold value.

12. The boil-off gas supply device according to claim 9, wherein
the return part has a flow rate control valve, and
the return controller is configured to decrease an opening degree of the flow rate control valve and to control the capacity of the second compressor unit that the amount of gas compressed by the second compressor unit decreases when the gas pressure detected by the suction-side gas pressure sensor is lower than the threshold value in the case where the gas pressure detected by the second discharge-side gas pressure sensor is lower than the second target pressure.

13. The boil-off gas supply device according to claim 1, further comprising a vent line configured to discharge the boil-off gas.

14. The boil-off gas supply device according to claim 10, wherein the return controller controls the capacity of the second compressor unit so that the amount of gas compressed by the second compressor unit increases when the gas pressure detected by the second discharge-side gas pressure sensor is lower than the second target pressure, on condition that the gas pressure detected by the suction-side gas pressure sensor is higher than the threshold value.

15. The boil-off gas supply device according to claim 1, wherein the suction-side pressure sensor detects a pressure of the boil-off gas in the storage tank, the suction-side pressure sensor being positioned on the suction side of the first compressor unit.

16. The boil-off gas supply device according to claim 1, wherein the capacity controller reduces an amount of gas suctioned from the storage tank and compressed by the first compressor unit when the pressure detected by the suction-side pressure sensor is lower than or equal to the second threshold value.

* * * * *